(12) United States Patent
Tanabe

(10) Patent No.: US 12,288,557 B2
(45) Date of Patent: *Apr. 29, 2025

(54) INFORMATION PROCESSING SYSTEM, INFORMATION PROCESSING METHOD, AND STORAGE MEDIUM

(71) Applicant: NEC Corporation, Tokyo (JP)

(72) Inventor: Masamichi Tanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,741

(22) Filed: Jul. 28, 2023

(65) Prior Publication Data

US 2023/0410802 A1 Dec. 21, 2023

Related U.S. Application Data

(63) Continuation of application No. 17/258,960, filed as application No. PCT/JP2019/026861 on Jul. 5, 2019.

(30) Foreign Application Priority Data

Jul. 18, 2018 (JP) ................................. 2018-134759

(51) Int. Cl.
*G10L 15/22* (2006.01)
*G06Q 30/0601* (2023.01)
*G06V 40/10* (2022.01)
*G10L 15/06* (2013.01)
*G10L 15/08* (2006.01)
(Continued)

(52) U.S. Cl.
CPC .......... *G10L 15/22* (2013.01); *G06Q 30/0613* (2013.01); *G06V 40/10* (2022.01); *G10L 15/063* (2013.01); *G10L 15/08* (2013.01); *G10L 15/24* (2013.01); *G10L 15/30* (2013.01); *G10L 2015/088* (2013.01)

(58) Field of Classification Search
USPC ............... 704/235, 246, 247, 251, 252, 275
See application file for complete search history.

(56) References Cited

U.S. PATENT DOCUMENTS 9,313,332 B1 * 4/2016 Kumar .................... G10L 17/24
9,911,290 B1   3/2018 Zalewski ............. G06Q 20/327
(Continued)

FOREIGN PATENT DOCUMENTS

JP   2002-366621 A   12/2002
JP   2014-149685 A    8/2014
(Continued)

OTHER PUBLICATIONS

International Search Report for PCT Application No. PCT/JP2019/026861, mailed on Oct. 1, 2019.
(Continued)

*Primary Examiner* — Leonard Saint-Cyr
(74) *Attorney, Agent, or Firm* — Sughrue Mion, PLLC

(57) ABSTRACT

Provided is an information processing system including: a voice information acquisition unit that acquires voice information including an utterance made by a person; a status acquisition unit that acquires status information related to status of the person; and a support information generation unit that generates support information used for supporting operation of the person based on the voice information and the status information.

9 Claims, 6 Drawing Sheets

(51) Int. Cl.
*G10L 15/24* (2013.01)
*G10L 15/30* (2013.01)

(56) References Cited

U.S. PATENT DOCUMENTS

| | | | |
|---|---|---|---|
| 10,922,738 B2* | 2/2021 | Swierk | H04M 3/5166 |
| 2004/0128196 A1 | 7/2004 | Shibuno | |
| 2008/0040113 A1* | 2/2008 | Onodera | G10L 15/00 |
| | | | 704/270.1 |
| 2011/0282662 A1* | 11/2011 | Aonuma | G10L 17/26 |
| | | | 704/E15.001 |
| 2014/0019311 A1 | 1/2014 | Tanaka | |
| 2014/0032261 A1 | 1/2014 | Kotak | |
| 2014/0222479 A1 | 8/2014 | Hirakawa et al. | |
| 2015/0195406 A1 | 7/2015 | Dwyer et al. | |
| 2015/0213396 A1 | 7/2015 | Iwai | |
| 2015/0281436 A1* | 10/2015 | Kumar | H04M 3/5166 |
| | | | 379/68 |
| 2017/0286940 A1 | 10/2017 | Clark et al. | |
| 2017/0300990 A1* | 10/2017 | Tanaka | G10L 15/08 |
| 2018/0261203 A1* | 9/2018 | Zoller | H04L 51/02 |
| 2019/0272547 A1* | 9/2019 | Coman | G06N 5/046 |
| 2019/0340658 A1* | 11/2019 | Udupa | G06Q 30/0239 |
| 2020/0412521 A1 | 12/2020 | Shi | G06Q 20/308 |
| 2021/0158813 A1 | 5/2021 | Sivasubramanian et al. | |

FOREIGN PATENT DOCUMENTS

| | | |
|---|---|---|
| JP | 2015-141563 A | 8/2015 |
| JP | 2015-149089 A | 8/2015 |
| JP | WO2015/092861 A1 | 3/2017 |
| JP | 2018-156522 A | 10/2018 |
| JP | 2019-29984 A | 2/2019 |

OTHER PUBLICATIONS

US Office Action for U.S. Appl. No. 17/258,960, mailed on Oct. 12, 2023.
JP Office Action for JP Application No. 2020-531246, mailed on Jun. 29, 2023 with English Translation.
US Office Action for U.S. Appl. No. 18/227,729 mailed on Mar. 13, 2024.
US Office Action for U.S. Appl. No. 18/227,729, mailed on Sep. 4, 2024.

* cited by examiner

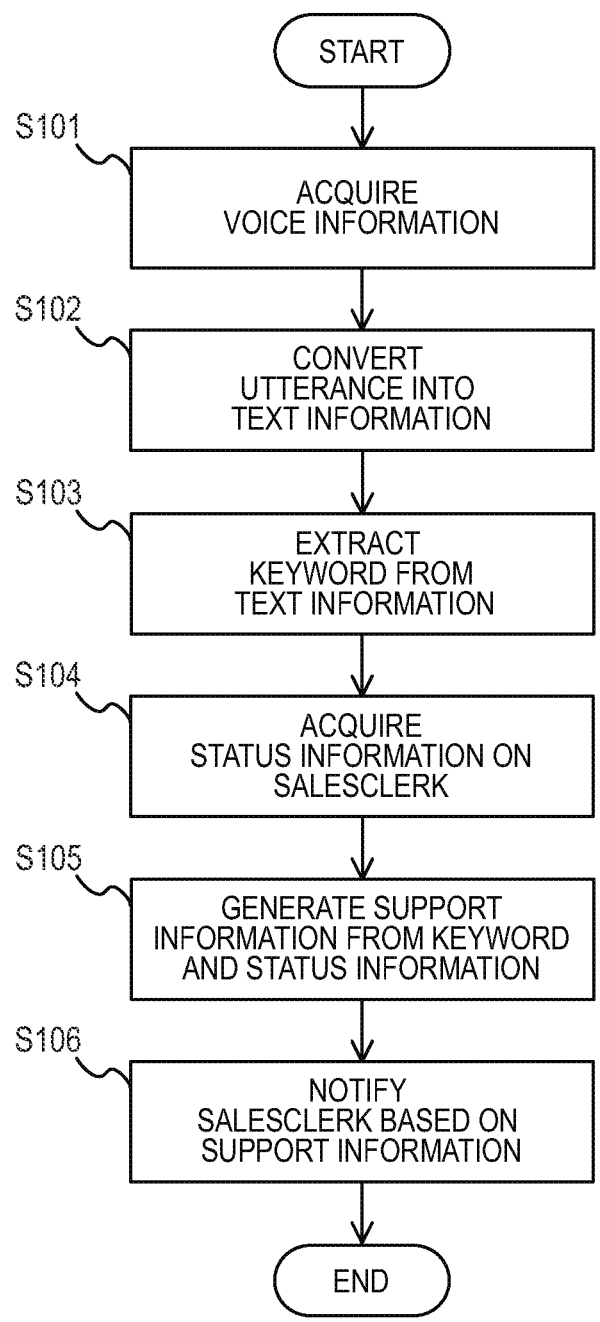

FIG. 5

| KEYWORD | POSITION OF SALESCLERK | SUPPORT INFORMATION | NOTIFIED TARGET |
|---|---|---|---|
| "TICKET", "UNABLE TO GET ISSUED", "RESERVATION NUMBER" | TERMINAL APPARATUS 114 | NOTIFY BY VOICE OF "PRESSING OF CONFIRMATION BUTTON" | HEADSET |
| "TICKET", "UNABLE TO GET ISSUED", "ERROR 123" | TERMINAL APPARATUS 114 | NOTIFY BY VOICE OF "REPLENISHMENT OF TICKET SHEET" | HEADSET |
| "TICKET", "UNABLE TO GET ISSUED", "NOT RESERVED" | TERMINAL APPARATUS 114 | NOTIFY BY VOICE THAT "UNRESERVED TICKET IS UNABLE TO BE ISSUED" | HEADSET |
| "TICKET", "UNABLE TO GET ISSUED" | TERMINAL APPARATUS 114 | DISPLAY MANUAL ON SCREEN | SCREEN OF TERMINAL APPARATUS |
| "TICKET", "UNABLE TO GET ISSUED" | REGISTER | DISPLAY MANUAL ON SCREEN | SCREEN OF REGISTER |
| "TICKET", "UNABLE TO GET ISSUED" | BACKYARD | DISPLAY MANUAL ON SCREEN | SCREEN OF STORE COMPUTER |
| "TICKET", "UNABLE TO GET ISSUED" | PRODUCT SHELF | NOTIFY BY VOICE OF "PRESSING OF CONFIRMATION BUTTON" | HEADSET |
| ... | ... | ... | ... |

INFORMATION PROCESSING SYSTEM, INFORMATION PROCESSING METHOD, AND STORAGE MEDIUM

CROSS-REFERENCE TO RELATED APPLICATIONS

The present application is a continuation application of U.S. patent application Ser. No. 17/258,960 filed on Jan. 8, 2021, which is a National Stage Entry of PCT/JP2019/026861 filed on Jul. 5, 2019, which claims priority from Japanese Patent Application 2018-134759 filed on Jul. 18, 2018, the contents of all of which are incorporated herein by reference, in their entirety.

TECHNICAL FIELD

The present invention relates to an information processing system, an information processing method, and a storage medium.

BACKGROUND ART

Patent Literature 1 discloses an operation support apparatus that notifies of an activation instruction for a register apparatus or the like based on the state in a shop, the state of the register apparatus, or the like.

CITATION LIST

Patent Literature

PTL 1: Japanese Patent Application Laid-open No. 2015-149089

SUMMARY OF INVENTION

Technical Problem

In the operation support apparatus illustrated as an example in Patent Literature 1, since an information source used to determine a notification content is limited, appropriate operation support in accordance with the status may not be provided.

The present invention has been made in view of the problem described above, and the example object thereof is to provide an information processing system, an information processing method, and a storage medium that may perform appropriate operation support in accordance with the operation status.

Solution to Problem

According to one example aspect of the present invention, provided is an information processing system including: a voice information acquisition unit that acquires voice information including an utterance made by a person; a status acquisition unit that acquires status information related to status of the person; and a support information generation unit that generates support information used for supporting operation of the person based on the voice information and the status information.

According to another example aspect of the present invention, provided is an information processing method including: acquiring voice information including an utterance made by a person; acquiring status information related to status of the person; and generating support information used for supporting operation of the person based on the voice information and the status information.

According to another example aspect of the present invention, provided is a storage medium storing a program that causes a computer to perform an information processing method including: acquiring voice information including an utterance made by a person; acquiring status information related to status of the person; and generating support information used for supporting operation of the person based on the voice information and the status information.

Advantageous Effects of Invention

According to the present invention, an information processing system, an information processing method, and a storage medium that may perform appropriate operation support in accordance with the operation status can be provided.

BRIEF DESCRIPTION OF DRAWINGS

FIG. 4 is a flowchart illustrating an outline of a process performed by the information processing system according to the first example embodiment.

FIG. 5 is a table illustrating a specific example of a configuration of a table used for a process of referencing a database.

DESCRIPTION OF EMBODIMENTS

Figure 1:
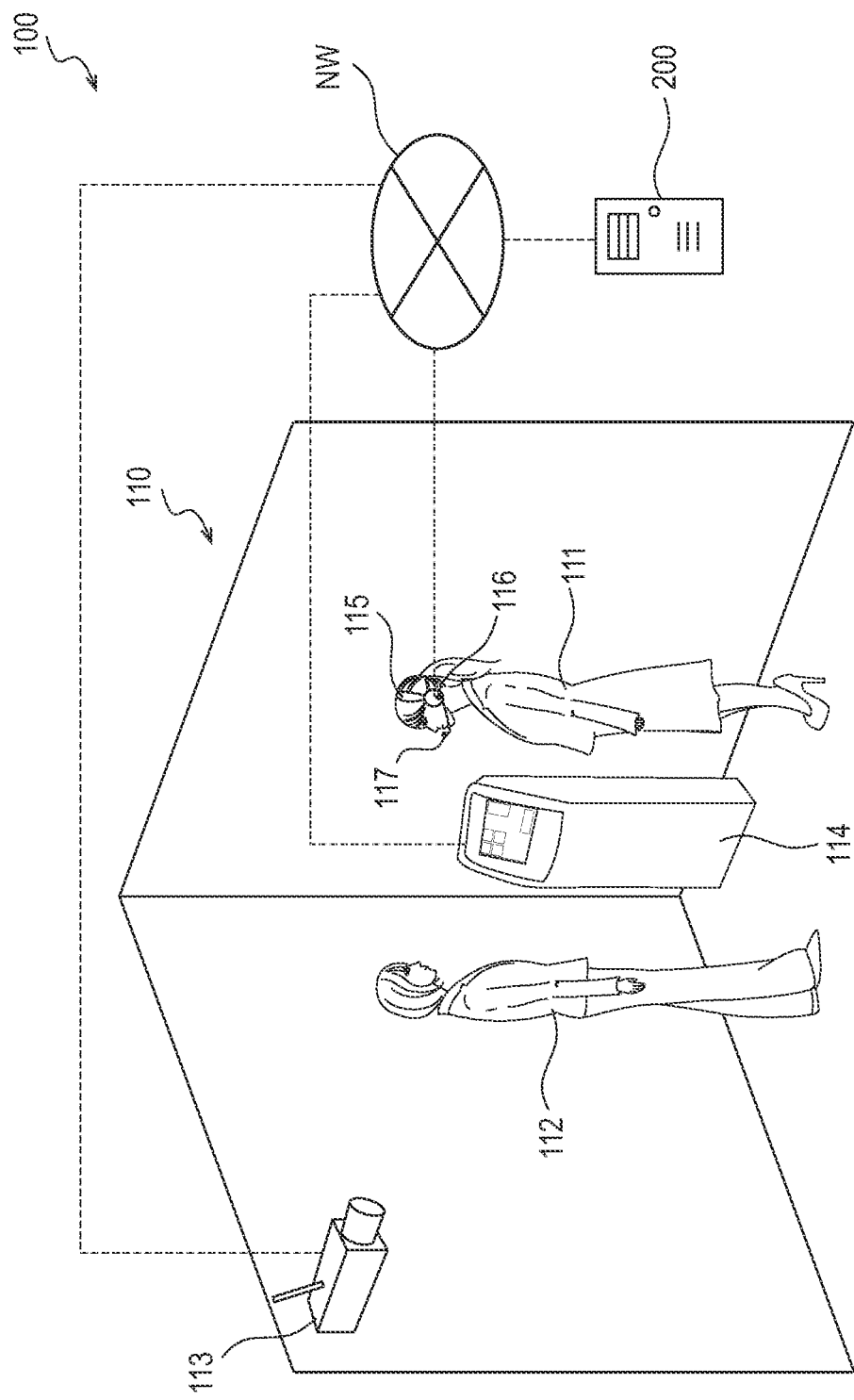
FIG. 1 is a diagram illustrating a specific example of the status in which operation support may be provided by an information processing system according to a first example embodiment.

Exemplary example embodiments of the present invention will be described below with reference to the drawings. In the drawings, the same components or corresponding components are labeled with the same references, and the description thereof may be omitted or simplified.

First Example Embodiment

The information processing system according to the present example embodiment will be described with reference to FIG. 1 to FIG. 5. The information processing system of the present example embodiment is an operation support system for supporting an operation of a salesclerk who sells a product, provides a service, or the like in a shop. The information processing system of the present example embodiment generates support information used for operation support and provides the support information to the salesclerk. Specific status in which the operation support using the information processing system of the present example embodiment may be performed will be described with reference to FIG. 1.

FIG. 1 is a diagram illustrating a specific example of the status in which the operation support may be performed by the information processing system 200 according to the present example embodiment. A camera 113 and a terminal apparatus 114 are installed in a sales area 110 in a shop 100. Further, a salesclerk 111 and a customer 112 are in the sales area 110, and the salesclerk 111 and the customer 112 are standing facing each other near the terminal apparatus 114. The salesclerk 111 wears a headset 115 on the head of the salesclerk 111.

For example, the terminal apparatus 114 is a kiosk terminal, which is an apparatus that provides various services of providing of information, issuance of a ticket, reservation of product purchasing, payment of a charge, or the like. The terminal apparatus 114 has a display device, an input device, a printer, an integrated circuit (IC) card reader, a barcode reader, or the like that are required for providing the above services.

The camera 113 is an image capture device for capturing an image of the sales area 110 provided in the shop 100. The camera 113 can capture an image (a static image or a moving image). Further, the camera 113 may have a microphone for acquiring a voice, and in such a case, the camera 113 can capture a moving image with voice data. The camera 113 may be a camera provided dedicatedly to the process performed by the information processing system 200 or may be a camera further having a surveillance camera function.

The headset 115 is an audio device in which a headphone 116 and a microphone 117 are integrated. The microphone 117 is a device that acquires an utterance of the salesclerk 111 or the customer 112. The headphone 116 is a device that provides a voice to the salesclerk 111.

The camera 113, the terminal apparatus 114, and the headset 115 further have a communication device based on a communication standard such as Ethernet (registered trademark), Wi-Fi (registered trademark), or the like. Accordingly, the camera 113, the terminal apparatus 114, and the headset 115 are connected to the information processing system 200 via a network NW such as Local Area Network (LAN), Wide Area Network (WAN), or the like so as to be able to communicate with the information processing system 200.

The headset 115 and the information processing system 200 communicate with each other, and thereby the information processing system 200 can receive voice data input by the microphone 117 and transmit voice data to be output by the headphone 116.

The scene of FIG. 1 will be described. The customer 112 is trying to get a ticket issued by using a printer provided in the terminal apparatus 114. However, since the customer 112 failed to get the ticket issued, the customer 112 calls the salesclerk 111 and asks for resolution of a problem. The salesclerk 111 is trying to find a cause of the problem while interacting with the customer 112. In the following description, the information processing system 200 provides operation support to the salesclerk 111 in the status above. However, operation support that may be realized by the information processing system 200 is not limited thereto.

Figure 2:
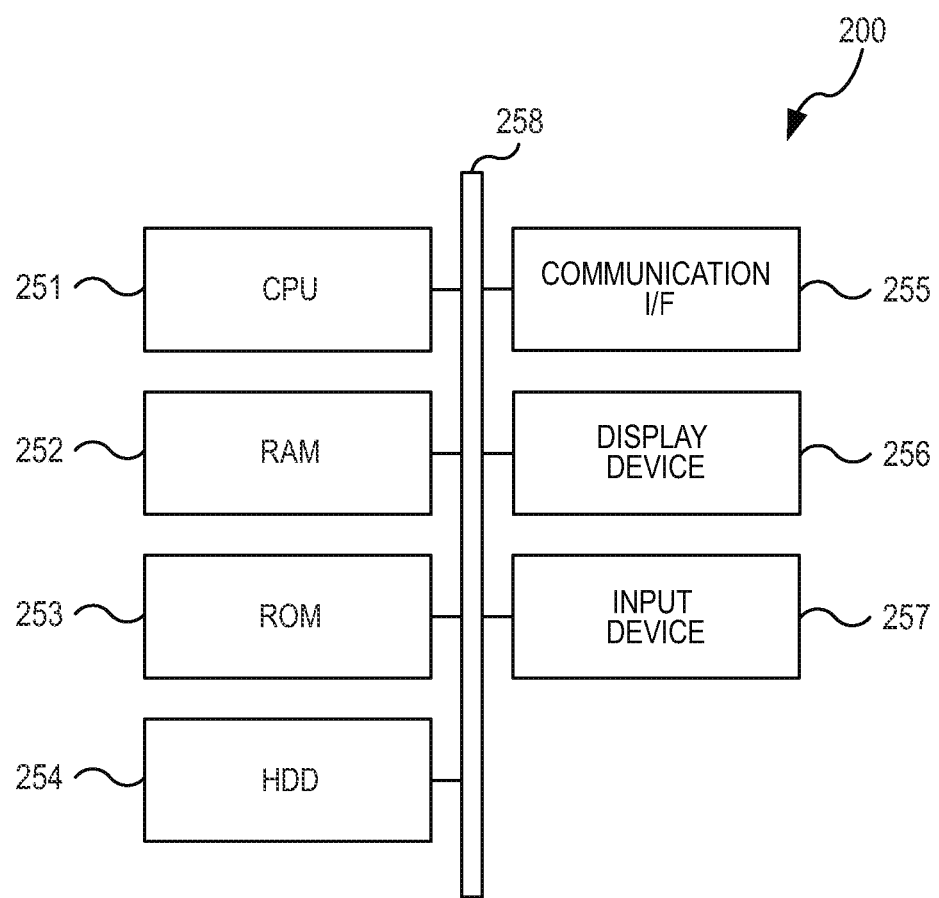
FIG. 2 is a block diagram illustrating a hardware configuration example of the information processing system according to the first example embodiment.

FIG. 2 is a block diagram illustrating a hardware configuration example of the information processing system 200. The information processing system 200 may be, for example, a computer such as a desktop personal computer (PC), a laptop PC, a tablet PC, or the like.

The information processing system 200 has a central processing unit (CPU) 251, a random access memory (RAM) 252, a read only memory (ROM) 253, and a hard disk drive (HDD) 254 as a computer that operates, controls, and stores. The information processing system 200 further has a communication interface (I/F) 255, a display device 256, and an input device 257. The CPU 251, the RAM 252, the ROM 253, the HDD 254, the communication I/F 255, the display device 256, and the input device 257 are connected to each other via a bus 258. Note that the display device 256 and the input device 257 may be connected to the bus 258 via a drive device (not illustrated) used for driving these devices.

While respective components forming the information processing system 200 are illustrated as an integrated device in FIG. 2, some of these functions may be provided by an external device. For example, the display device 256 and the input device 257 may be an external device independent of a part forming the function of a computer including the CPU 251 and the like.

The CPU 251 is a processor having a function of performing a predetermined operation in accordance with a program stored in the ROM 253, the HDD 254, or the like and also controlling each component of the information processing system 200. The RAM 252 is formed of a volatile storage medium and provides a temporary memory area necessary for the operation of the CPU 251. The ROM 253 is formed of a nonvolatile storage medium and stores necessary information such as a program used for the operation of the information processing system 200. The HDD 254 is a storage device that is formed of a nonvolatile storage medium and stores data required for processing, a program for operating the information processing system 200, or the like.

The communication I/F 255 is a communication interface based on the specification such as Ethernet (registered trademark), Wi-Fi (registered trademark), 4G, or the like, which is a module used for communicating with other devices. The display device 256 is a liquid crystal display, an OLED display, or the like and is used for displaying an image, a text, an interface, or the like. The input device 257 is a keyboard, a pointing device, or the like and is used by the user for operating the information processing system 200. An example of the pointing device may be a mouse, a trackball, a touch panel, a pen tablet, or the like. The display device 256 and the input device 257 may be integrally formed as a touch panel.

Note that the hardware configuration illustrated in FIG. 2 is illustrated as an example, and a device other than the above may be added, and some of the devices may not be provided. Further, some of the devices may be replaced with another device having the same function. Furthermore, some of the functions of the present example embodiment may be provided by another device via a network, or the function of the present example embodiment may be distributed to and implemented in a plurality of devices. For example, the HDD 254 may be replaced with a solid state drive (SSD) using a semiconductor memory or may be replaced with cloud storage.

Figure 3:
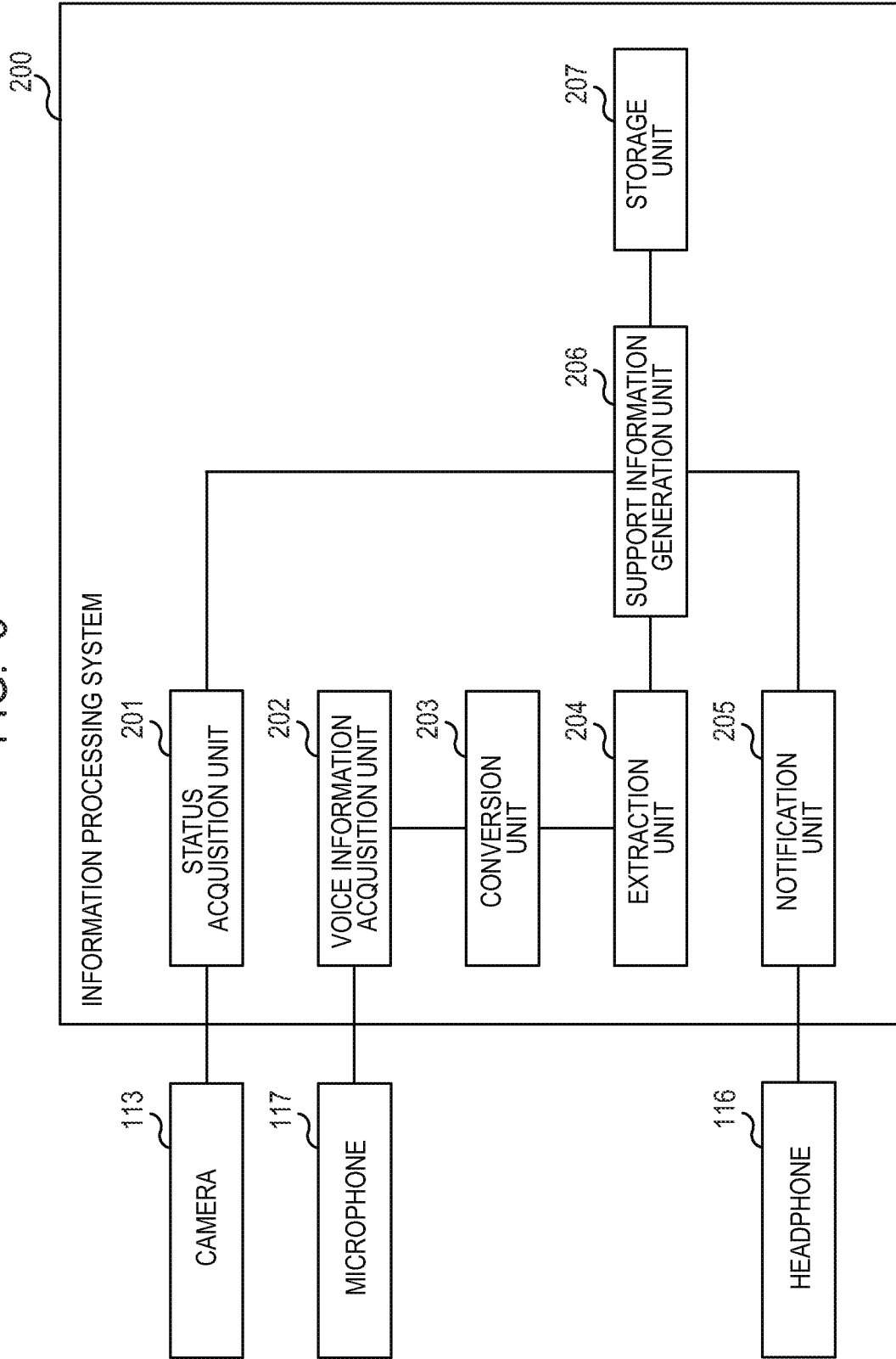
FIG. 3 is a function block diagram of the information processing system according to the first example embodiment.

FIG. 3 is a function block diagram of the information processing system 200 according to the present example embodiment. The information processing system 200 has a status acquisition unit 201, a voice information acquisition unit 202, a conversion unit 203, an extraction unit 204, a notification unit 205, a support information generation unit 206, and a storage unit 207.

The CPU 251 loads a program stored in the ROM 253, the HDD 254, or the like into the RAM 252 and executes the program. Accordingly, the CPU 251 implements functions of the conversion unit 203, the extraction unit 204, and the support information generation unit 206. The process performed in each of these units will be described later. The CPU 251 implements a function of the status acquisition unit 201 by controlling a communication I/F 255 based on the program, acquiring image information on an image, a moving image, or the like from the camera 113, and performing a predetermined process. The CPU 251 implements a function of the voice information acquisition unit 202 by controlling the communication I/F 255 based on the program and acquiring voice information from the microphone 117. The CPU 251 implements a function of the notification unit 205 by controlling the communication I/F 255 based on the program and transmitting voice information to be notified to the salesclerk 111 to the headphone 116. The CPU 251 implements a function of the storage unit 207 by controlling the HDD 254.

FIG. 4 is a flowchart illustrating the outline of a process performed by the information processing system 200 according to the present example embodiment. The process performed by the information processing system 200 will be described with reference to FIG. 4.

In step S101, the voice information acquisition unit 202 acquires voice information including an utterance of the salesclerk 111 or the customer 112 such as an interaction between the salesclerk 111 and the customer 112 acquired by the microphone 117. For example, the acquisition of the voice information described above may be performed by receiving the voice information from the microphone 117 via the network NW or reading data temporarily stored in a storage device from the microphone 117. Note that the voice information acquisition unit 202 can perform a process of sampling, quantization, noise removal, compression, or the like in the course of acquiring the acquired voice as voice information.

Note that an utterance that may be included in voice information does not have to be an interaction between the salesclerk 111 and the customer 112, and may be a one-way utterance of the salesclerk 111 or the customer 112 (for example, a greeting of "Hello" or the like).

In step S102, the conversion unit 203 converts the contents of the utterance of the salesclerk 111 or the customer 112 included in the voice information by voice recognition technology into text information. The text information after conversion may be text data, for example.

In step S103, the extraction unit 204 extracts a keyword to be input to the support information generation unit 206 from the text information obtained by conversion performed by the conversion unit 203. For example, the extraction process described above may be a process of searching the text information for whether or not a word registered in advance is present and extracting the word as a keyword when the registered word appears. A keyword to be registered in advance is selected from words which are useful to identify a target for operation support.

In step S104, the status acquisition unit 201 acquires an image in the sales area 110 acquired by the camera 113. The status acquisition unit 201 then acquires status information related to the status of the salesclerk 111 from the acquired image by using image recognition technology.

The status information of the salesclerk 111 acquired by the status acquisition unit 201 may include information related to the position of the salesclerk 111 in the shop 100, information related to the work state of the salesclerk 111, or the like.

The information related to the position of the salesclerk 111 may be, for example, information representing whether the salesclerk 111 is in the sales area 110 or in an area other than the above (for example, a backyard in the shop 100, outside of the shop 100, or the like). Further, when the position of the salesclerk 111 in the sales area 110 is required to be identified, the information related to the position of the salesclerk 111 may further include information representing where the salesclerk 111 is in the sales area 110. Specifically, the information may include information that may distinguish status that the salesclerk 111 is at a sales counter, status that the salesclerk 111 is near the terminal apparatus 114, status that the salesclerk 111 is near a product shelf, or the like.

The information related to a work state of the salesclerk 111 may include, for example, information which may distinguish status that the salesclerk 111 is responding to an inquiry from the customer 112, status that the salesclerk 111 is selling a product at the sales counter, status that the salesclerk 111 is standing by in the backyard, or the like.

The acquisition of the information related to a work state will be more specifically described below. Typically, the status of the salesclerk 111 may be determined based on a position of the salesclerk 111 obtained from an image and information as to whether or not the customer 112, other salesclerks, or a predetermined article is present around (near) the salesclerk 111, and the information related to the work state of the salesclerk 111 may be acquired. It is required to extract the salesclerk 111, the customer 112, or the like from the image and further determine the position relationship between the salesclerk 111, the customer 112, or the like in the image by using an image processing technology in order to determine whether or not the customer 112 or the like are present around the salesclerk 111. An example of this image processing will be described in order.

Specifically, the image recognition technology that may be used for extraction of the salesclerk 111, the customer 112, or the like may be a technology to identify a position or the like of the salesclerk 111 by searching the image for a part that matches a feature (a feature amount vector, for example) of the salesclerk 111 stored in advance. The feature of the salesclerk 111 may be a feature of an article possessed by the salesclerk 111, such as a uniform, a name tag, the headset 115, or the like and may be a biological feature of a face, a body type, or the like of the salesclerk 111. For example, when a person wearing a uniform, the headset 115, or the like is in the image, it is determined that the person is not the customer 112 but the salesclerk 111. Accordingly, it is possible to determine the presence or absence of the salesclerk 111 in the image and acquire the position of the salesclerk 111. Furthermore, it is possible to distinguish which of the salesclerk 111 or the customer 112 the speaker is. Further, when a plurality of salesclerks 111 are in the image, the feature described above can be used to distinguish a plurality of salesclerks 111 from each other. As described above, when a plurality of persons such as the salesclerk 111 and the customer 112 are found in the image, the attributes of the persons can be acquired.

Further, by using the same scheme to search the image for a feature of an article stored in advance (for example, a sales counter, a register, the terminal apparatus 114, a product shelf, a store computer in the backyard, or the like), it is possible to determine the presence or absence of the article, determine the type of the article, and acquire the position of the article. Alternatively, by using the same scheme to search the image for the customer 112, it is possible to determine the presence or absence of the customer 112 and acquire the position of the customer 112. Herein, an algorithm to identify the customer 112 may be, for example, an algorithm to determine, out of persons in an image, the person of interest who is not the salesclerk 111 as the customer 112 or to determine the person based on a feature of an article such as a shopping basket, a cart, or the like possessed by the customer 112.

Next, an example of an algorithm to identify whether or not the customer 112 is present around the salesclerk 111 based on the position relationship between the salesclerk 111 and the customer 112 identified by the above scheme will be described. The algorithm may be, for example, an algorithm to determine that the customer 112 is present around the salesclerk 111 when the number of pixels between the salesclerk 111 and the customer 112 in the image is less than or equal to a predetermined number of pixels and determine that the customer 112 is not present around the salesclerk 111 when the number of pixels between the salesclerk 111 and the customer 112 in the image is greater than the predetermined number of pixels. Further, similarly, it may be determined that the customer 112 is not present around the salesclerk 111 when the customer 112 is not found in the image. Herein, the predetermined number of pixels can be defined in accordance with the ratio between the actual size of a capturing range of the image and the number of pixels of the image and, specifically, may be the number of pixels corresponding to the actual size of several meters. In such a case, the algorithm described above can determine whether or not the customer 112 is present within a range of several meters from the salesclerk 111. The algorithm described above may be similarly applied when it is identified whether or not another salesclerk or a predetermined article is present around the salesclerk 111.

Next, the identification of the work state of the salesclerk 111 based on the relationship between the position of the salesclerk 111 and a person present around the salesclerk 111 will be described in more detail.

First, a case where no person is around the salesclerk 111 will be described. In such a case, when the position of the salesclerk 111 is near the sales counter, it may be determined that the work state of the salesclerk 111 is a state of standing by for serving customers. When the position of the salesclerk 111 is near the product shelf, it may be determined that the work state of the salesclerk 111 is a state of working on product management such as product displaying. When the position of the salesclerk 111 is in the backyard, it may be determined that the work state of the salesclerk 111 is a state of performing work on less urgent work such as inventory management or performing no operation.

Next, a case where the customer 112 is around the salesclerk 111 will be described. In such a case, when the position of the salesclerk 111 is near the sales counter, it may be determined that the work state of the salesclerk 111 is a state of selling a product to the customer 112. When the position of the salesclerk 111 is near the product shelf, it may be determined that the work state of the salesclerk 111 is a state of responding to a customer with respect to a product such as explaining a product. When the position of the salesclerk 111 is near the terminal apparatus 114, it may be determined that the work state of the salesclerk 111 is a state of dealing with a trouble related to the terminal apparatus 114. In any case, it can be said that the salesclerk 111 is serving a customer and performing highly urgent work.

Next, a case where another salesclerk is around the salesclerk 111 will be described. In such a case, when the position of the salesclerk 111 is near the sales counter, it may be determined that the work state of the salesclerk 111 is a state of collaborative work such as a state of serving a customer together with another salesclerk, providing an instruction from one salesclerk to the other salesclerk, or the like. When the position of the salesclerk 111 is near the product shelf, it may be determined that the work state of the salesclerk 111 is a state of collaboratively working on product management such as product displaying. When the position of the salesclerk 111 is in the backyard, it may be determined that the work state of the salesclerk 111 is a state of collaboratively working on less urgent work such as inventory management or performing no operation.

As described above, the image recognition technology may be a technology to identify the position or the work state of the salesclerk 111 by recognizing the salesclerk 111 and an object or a person around the salesclerk 111.

Note that the order of the processes from step S101 to step S103 and the process of step S104 may be reversed. Further, at least some of the processes from step S101 to step S103 and the process of step S104 may be performed in parallel.

In step S105, the support information generation unit 206 generates support information used for supporting the operation of the salesclerk 111 based on the keyword extracted by the extraction unit 204 and the status information acquired by the status acquisition unit 201.

The process for the support information generation unit 206 to generate the support information may be a process using a learning model generated by machine learning or a process of referencing a database.

First, an example process which uses the learning model generated by machine learning will be described. In this example, the support information generation unit 206 has a mathematical model which enables machine learning, such as a neural network. The learning model can be generated by inputting a pair of a keyword and status information as training data to the support information generation unit 206 and performing machine learning so as to output appropriate support information corresponding to the input. The support information generation unit 206 can perform a process of generating support information based on a keyword and status information by incorporating the learning model in the support information generation unit 206 in advance. A scheme to utilize such machine learning has an advantage that a model can be generated automatically by only preparing training data.

Next, an example process of referencing a database will be described. In this example, the support information generation unit 206 stores a database in which keywords and status information are associated with each other in the storage unit 207 in advance. The database can be created with reference to the past operation support content, an operation manual, or the like. The support information generation unit 206 generates support information by referencing the database in the storage unit 207 and acquiring support information corresponding to an input keyword and status information. The database has higher readability than a mathematical model of machine learning, such as a neural network. Therefore, a scheme to reference a database has an advantage of easier revision work of adding a new keyword or the like. Note that the database may be a table in which keywords, status information, and support information are used as keys.

A specific configuration example of a table used for the process of referencing a database described above will be described with reference to FIG. 5. FIG. 5 illustrates a table in which "keyword" generated based on voice information including an utterance, "position of salesclerk" that is one of status information, "support information", and "notified target" notified of the support information are used as keys. The words "terminal apparatus 114", "register", and "product shelf" indicated in "position of salesclerk" as an example represent that the salesclerk is near these objects. The word "backyard" indicated in "position of salesclerk" as an example represents that the salesclerk is in the backyard outside the sales area 110. For example, when "ticket", "unable to get issued", and "reservation number" are input as keywords, and "terminal apparatus 114" is input as a position of a salesclerk, it can be understood from the table in FIG. 5 that a notification of "pressing of confirmation button" is provided in a form of a voice via a headset as the support information. As described above, in this example, the support information generation unit 206 can generate the support information by referencing the table.

Further, in this example, the table is configured such that a notified target from a notification unit 205 described later may be determined in accordance with the keyword and the position of the salesclerk. For example, when "ticket" and "unable to get issued" are input as keywords, and "backyard" is input as the position of the salesclerk 111, the notified target is "screen of store computer". In this scene, since the salesclerk 111 is estimated to be in a less urgent state, the notification unit 205 can cause the screen of the store computer installed in the backyard to display a manual and cause the salesclerk 111 to view the manual and thereby ensure to cope with a trouble. As described above, in this example, it is possible to provide a notification to the salesclerk by a voice notification, display on the screen, or the like by selecting an appropriate notified target in accordance with the content of a keyword and the position of the salesclerk.

In step S106, the notification unit 205 performs a process for notifying the salesclerk 111 of support information generated by the support information generation unit 206. Specifically, the notification unit 205 transmits voice data including the support information to a headphone 116. The headphone 116 outputs a voice based on the voice data and provides a notification for supporting operation to the salesclerk 111. Note that, for example, a process of converting the support information into the voice data may use a sentence read-aloud technology to generate a voice from text data. Further, as described above, a notified target of the notification unit 205 may be different in accordance with the process performed by the support information generation unit 206. The notified target may be determined by referencing a learning model generated by machine learning or a database in accordance with the process performed by the support information generation unit 206.

Note that the process of step S102 and step S103 may be omitted. For example, when the support information generation unit 206 can directly generate support information from text information using a sentence analysis technology or the like, the process of step S103 may be omitted. Further, when the support information generation unit 206 can extract a feature from voice data acquired by the voice information acquisition unit 202 and generate support information based on the feature, the process of step S102 and step S103 may be omitted.

Next, in the status illustrated in FIG. 1, the example of the process described above will be more specifically described. The following example illustrates an application example for helping understanding of a flow and an advantageous effect of a process of the present example embodiment but does not limit a scene to which the information processing system 200 of the present example embodiment may be applied.

An interaction made between the salesclerk 111 and the customer 112 in the scene illustrated in FIG. 1 is as follows.

The salesclerk 111: "May I help you?"

The customer 112: "A reserved ticked does not come out from the machine."

The salesclerk 111: "You are unable to get a ticket issued, aren't you? Did you input a reservation number?"

The customer 112: "Yes, I did input the reservation number."

The microphone 117 of the headset 115 worn by the salesclerk 111 acquires a voice including at least an utterance of the salesclerk 111 in the interaction. Herein, since the microphone 117 is provided near a mouth of the salesclerk 111, the microphone 117 can acquire an utterance of the salesclerk 111. The voice information acquisition unit 202 acquires voice information based on the voice via the network NW.

The conversion unit 203 acquires text information corresponding to the utterance of the salesclerk 111 from the voice information described above. The text information will be as follows. Note that the text information may further include an utterance of the customer 112.

"May I help you?"

"You are unable to get a ticket issued, aren't you? Did you input a reservation number?"

The extraction unit 204 extracts a keyword registered in advance from the text information described above. The registered keywords are useful words to identify a target for operation support. In the example described above, "ticket", "unable to get issued", and "reservation number" are extracted as keywords. These extracted keywords are input to the support information generation unit 206.

The status acquisition unit 201 detects the salesclerk 111 and the terminal apparatus 114 near the salesclerk 111 from an image captured by the camera 113. Status information indicating that the salesclerk 111 is near the terminal apparatus 114 is input to the support information generation unit 206.

As described above, keywords: "ticket", "unable to get issued", and "reservation number" and the status information indicating that the salesclerk 111 is near the terminal apparatus 114 are input to the support information generation unit 206. The support information generation unit 206 generates support information on the operation related to "terminal apparatus 114", "ticket", "unable to get issued", and "reservation number" by using a learning model using the information described above as input information, referencing a database, or the like.

Specifically, in the operation of the terminal apparatus 114, a method to deal with a case where a ticket is unable to be issued after a reservation number is input is extracted from the information. Herein, the terminal apparatus 114 has a specification according to which a ticket can be issued when a confirmation button is pressed to enter the input after a reservation number is input. In such a case, for example, a text message "Please press the confirmation button" is extracted as support information.

When the process of the support information generation unit 206 is to reference the table in FIG. 5, the process will be described in more detail. In such a case, based on keywords: "ticket", "unable to get issued", and "reservation number" and status information indicating that the salesclerk 111 is near the terminal apparatus 114, support information and a notified target corresponding thereto are output. The support information in such a case is to notify of "pressing of a confirmation button" in a form of a voice, and the notified target is a headset.

The notification unit 205 converts a text message "Please press the confirmation button" into a voice and transmits the voice to the headphone 116. The headphone 116 notifies the salesclerk 111 of the voice "Please press the confirmation button". Accordingly, the salesclerk 111 may understand an operation procedure that it is possible to get a ticket issued by pressing the confirmation button of the terminal apparatus 114 and thus may explain an operation method to the customer 112.

As described above, the information processing system 200 of the present example embodiment generates support information based on both voice information including an utterance of the salesclerk 111 or the customer 112 and status information related to the status of the salesclerk 111. The reason why both the voice information and the status information are used will be described.

When only the voice information is used, since it is not possible to take into consideration that the utterance was made in what status, information on the operation status that is the assumption in generation of the support information may be insufficient. In the specific example described above, even when trying to generate the support information by using only the keywords of "ticket", "unable to get issued", and "reservation number", appropriate information may not be provided because it is unclear which apparatus is unable to issue a ticket.

Further, when only the status information is used, information indicating what kind of support is required by the salesclerk 111 may be insufficient. In the specific example described above, with only the information indicating that the salesclerk 111 is near the terminal apparatus 114, appropriate information may not be provided because it is unclear that the salesclerk 111 requires support for what.

In contrast, the information processing system 200 of the present example embodiment uses both the voice information and the status information. Accordingly, it is possible to generate the support information by taking into consideration of a request that is a basis of a specific content of support included in an utterance and information related to the operation status of the salesclerk 111 that is the assumption in generation of the support information. Specifically, when the status information of "terminal apparatus 114" is added to "ticket", "unable to get issued", and "reservation number" included in the voice information, it is identified that the apparatus which is unable to issue a ticket is "terminal apparatus 114". Therefore, the generated support information becomes more appropriate.

As described above, according to the present example embodiment, the information processing system 200 that may perform the appropriate operation support in accordance with the operation status of the salesclerk 111 is provided.

Further, conventionally, when a problem occurs in work of the salesclerk 111, there is a problem that additional work such as referencing a work manual, inquiring a call center, or the like occurs and it takes time for resolving the problem. In contrast, since the information processing system 200 of the present example embodiment can automatically find a problem from the voice information and the status information without requiring the salesclerk 111 to ask a question and can quickly provide appropriate support information corresponding to the status, increased efficiency of problem resolution is realized.

Modified Example 1

In the example described above, although operation support related to coping with a trouble in issuance of a ticket on the terminal apparatus 114 has been illustrated as an example, the first example embodiment may be used for support of an operation other than the above. Accordingly, another example for an application example of the first example embodiment will be described as modified example 1. In this example, the salesclerk 111 made an utterance to the effect that "printer does not work".

In this example, the keyword may be "printer", "not work", or the like. Further, the support information to be output is a manual illustrating an operation method of the printer or the like. In general, however, there are many printers such as a printer used for printing a receipt provided in a register (Point Of Sales (POS) terminal), a printer used for printing a ticket of the terminal apparatus 114 that is a kiosk terminal, a printer attached to a store computer in the backyard, and the like in a shop. Further, an operation procedure or a method for coping with a trouble is different on a printer basis. Thus, with only the keyword described above, it is not identified which printer information is to be provided.

Thus, the support information generation unit 206 generates, as support information, a manual of a different printer or the like based on the status information on the position of the salesclerk. Specifically, when the salesclerk 111 is near a sales counter or a register, the support information generation unit 206 generates, as support information, a manual or the like for a printer provided to the register. When the salesclerk 111 is near the terminal apparatus 114 in the shop 100, the support information generation unit 206 generates, as support information, a manual or the like for a printer provided to the terminal apparatus 114. When the salesclerk 111 is in the backyard, the support information generation unit 206 generates, as support information, a manual or the like for a printer provided to the store computer.

As described above, in the present modified example, by taking the position of the salesclerk 111 into consideration to generate support information, it is possible to supplement information from the position of the salesclerk 111 even when an unclear keyword such as "printer" is present in a keyword included in an utterance of the salesclerk 111. Accordingly, an information processing system that can differentiate the content of support information in accordance with the position of the salesclerk 111 and may perform more appropriate operation support is provided.

Modified Example 2

Another example for an application example of the first example embodiment will be described as modified example 2. In this example, the salesclerk 111 made an utterance to the effect that some trouble occurred.

In this example, support information to be output is a method for coping with a trouble. However, a method of providing appropriate support information differs in accordance with the content of a trouble, the status of the salesclerk 111, or the like.

Accordingly, the support information generation unit 206 generates a method for coping with a different trouble in a different form based on the content of a keyword, status information, or the like. Specifically, when a keyword includes a word indicating that a trouble has occurred in a system of the shop 100, such as "system trouble", the content of the trouble is a severe trouble that much affects the operation. Accordingly, to enable the salesclerk 111 to reliably resolve the trouble even taking some time, the support information generation unit 206 generates a detailed coping method as support information.

On the other hand, when the content of the trouble is not severe and the salesclerk 111 is in the backyard, the support information generation unit 206 generates a simple coping method as support information. The notification unit 205 then presents a coping method in a simple manner to a store computer in the backyard, an ordering terminal, or the like possessed by the salesclerk 111. Further, in this display method, a configuration that uses chat application software to display support information and thereby can accept a question from the salesclerk 111 side may be employed. When the salesclerk 111 is serving a customer, such as when the customer 112 is near the salesclerk 111, the support information generation unit 206 generates a simple coping method as support information so as to be able to immediately resolve the trouble. The notification unit 205 then provides the simple coping method to the salesclerk 111 by voice.

As described above, in the present modified example, a method of providing a method for coping with a trouble, the amount of information to be provided, and a provided target can be differentiated in accordance with the content of a keyword, status information, or the like. Accordingly, an information processing system that may perform more appropriate operation support is provided.

Modified Example 3

Another example for an application example of the first example embodiment will be described as modified example 3. In this example, the salesclerk 111 made an utterance to the effect that no product was displayed on the product shelf.

In this example, support information to be output is an instruction that urges the salesclerk 111 to come to the backyard to take a product and display the products. However, when the salesclerk 111 is serving a customer, such as when the customer 112 is near the salesclerk 111, it is not possible to come to the backyard to take a product. Thus, in such a case, the support information generation unit 206 withholds generation of support information.

Accordingly, it is possible to suppress inappropriate support information from being presented in a scene of serving a customer. Note that the support information generation unit 206 may perform a process of withholding a notification from the notification unit 205 after normally performing generation of support information. In such a way, in the present modified example, the support information generation unit 206 performs a process of controlling the timing of providing support information to the salesclerk 111 in accordance with the content of a keyword, the status of the salesclerk 111, or the like. Note that, in this example, when the salesclerk 111 finishes serving a customer and stands by, generation of support information that has been withheld is performed to generate support information including an instruction to the salesclerk 111 for coming to the backyard to take a product.

The system described in the example embodiment described above may be configured as with the following second example embodiment.

Second Example Embodiment

Figure 6:
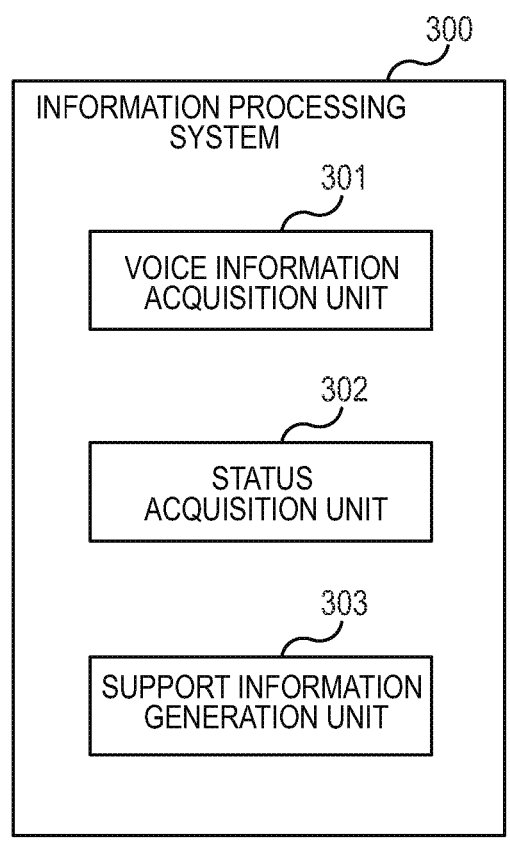
FIG. 6 is a function block diagram of an information processing system according to a second example embodiment.

FIG. 6 is a function block diagram of an information processing system 300 according to the second example embodiment. The information processing system 300 has a voice information acquisition unit 301, a status acquisition unit 302, and a support information generation unit 303. The voice information acquisition unit 301 acquires voice information including an utterance made by a person. The status acquisition unit 302 acquires status information related to the status of the person. The support information generation unit 303 generates support information used for supporting operation of the person based on the voice information and the status information.

According to the present example embodiment, the information processing system 300 that may perform appropriate operation support in accordance with the operation status is provided.

Modified Example Embodiment

The present invention can be changed as appropriate within the scope not departing from the spirit of the present invention without being limited to the example embodiments described above.

Although the status acquisition unit 201 acquires status information from the camera 113 installed in the sales area 110 in the example embodiments described above, the status acquisition unit 201 may acquire status information from a device other than the above as long as it is possible to acquire status information related to the status of the salesclerk 111.

For example, when the salesclerk 111 possesses a communication terminal such as a smartphone, a tablet PC, or the like that enables positioning by using Global Positioning System (GPS) or the like, the status acquisition unit 201 may acquire the position of the salesclerk 111 from the communication terminal as status information. Further, when a beacon of Bluetooth (registered trademark) Low Energy (BLE) is installed inside the shop 100 and the salesclerk 111 possesses a communication terminal that can receive a signal from the beacon, the communication terminal can position the salesclerk 111. Also in such a case, the status acquisition unit 201 can acquire the position of the salesclerk 111 from the communication terminal as status information.

Further, when a terminal such as a computer, a POS terminal, or the like is installed inside the shop 100 and when the salesclerk 111 has logged in these terminals, the salesclerk 111 is highly likely to be operating these terminals. Accordingly, the status acquisition unit 201 can also acquire the login state of these terminals as status information.

The example described above is an example in which the status acquisition unit 201 acquires status information from a device that is different from the microphone 117. In such a case, status information including position information or the like which is difficult to be acquired by the microphone 117 alone can be acquired. Further, in such a case, status information can be acquired from an information source such as an image other than voice information and the information source is diversified.

On the other hand, status information may be acquired from voice information acquired by the microphone 117. For example, when the status of the salesclerk 111 can be known from the loudness of the voice, the tone of the voice, the interval between utterances, or the like acquired by the microphone 117, the status acquisition unit 201 can acquire status information from the microphone 117. For example, since a voice is often uttered at a higher tone in serving a customer than in a typical situation, it may be determined from the tone of a voice whether or not the salesclerk 111 is serving a customer.

Further, when a plurality of microphones are installed in respective different places in the shop 100, the status acquisition unit 201 can identify the position of the salesclerk 111 based on which of the microphones acquired a voice and can acquire the position thereof as status information. For example, when microphones are installed in the sales area 110 and the backyard in the shop 100 and if the microphone of the backyard acquired a voice, it may be determined that the salesclerk 111 is in the backyard and thus is not serving a customer. Note that the microphone may be installed to the shop 100 itself such as a ceiling, a wall, a floor, or the like of the shop 100 or may be installed to an article in the shop 100, such as the terminal apparatus 114, a POS terminal, a copying machine, a product shelf, a sales counter, or the like.

Further, although support information provided to the salesclerk 111 is knowledge for carrying out an operation of the salesclerk 111 in the example embodiments described above, such support information may be a work instruction to the salesclerk 111. For example, when the support information generation unit 206 determines based on voice information and status information that the status in which the salesclerk 111 has to display a product on a product shelf occurs, the notification unit 205 may perform a process such as generation of an operation instruction voice that orders the salesclerk 111 to display a product.

Further, although the notification unit 205 performs the process of transmitting voice data including support information to the headphone 116 in the example embodiments described above, a process other than the above may be employed as long as notification to the salesclerk 111 is possible. For example, when the salesclerk 111 possesses a terminal having a display device, such as a tablet PC, a smartphone, or the like, the notification unit 205 may perform a process of displaying a text, a figure, a symbol, a picture, or the like including support information on the display device. In such a case, a configuration that uses chat application software to display support information and thereby can accept a question from the salesclerk 111 side may be employed. In such a case, the salesclerk 111 is able to obtain further detailed information by asking an additional question. Further, display on the display device and notification by voice may be used together.

Further, although a scene in which the salesclerk 111 and the customer 112 face each other has been illustrated as an example in the above example embodiments, the present invention is applicable to a scene of serving a customer without facing, such as a voice call, a video call, or the like.

Further, although status information is used for identifying the content of support information to be provided or the like in the example embodiments described above, the amount of support information provided may be adjusted based on the status of the salesclerk 111. For example, when the salesclerk 111 is serving a customer, it is desirable to reduce the amount of support information and simplify the support information because the problem is required to be promptly resolved. In contrast, when the salesclerk 111 encounters a highly difficult problem such as a system trouble, it is desirable to enrich support information because detailed information is required. Further, a device that provides support information may be changed based on the situation of the salesclerk 111. For example, when the salesclerk 111 is serving a customer, it is desirable to provide a notification by voice so as not to interrupt the serving to the customer, and when the salesclerk 111 is dealing with a system trouble, it is desirable to provide a notification by display on the display device so as to transfer accurate information in writing.

In the example embodiments described above, acquisition of voice information by the voice information acquisition unit 202 may be performed all the time or may be performed intermittently. When voice is acquired all the time, this further improves the real-time property and thus is effective in an environment where a real-time property is required, such as a shop in which customers are much frequently served. If voice information is acquired all the time, however, the processing load increases, and therefore acquisition of voice information may be performed intermittently when a reduction of the processing load is requested or when a real-time property is less required. Further, acquisition of voice information may be performed when a predetermined condition is satisfied. For example, a voiceprint analysis function may be provided in advance to the voice information acquisition unit 202, and the process of the present example embodiment may be performed only when a voice of a person other than the salesclerk 111 is input. In such a case, it is possible to perform a process of ignoring a voice of low importance such as speech of the salesclerk 111 to himself/herself while causing support information to be provided during serving a customer.

The scope of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself. Further, one or two or more components included in the example embodiments described above may be a circuit such as an ASIC, an FPGA, or the like configured to implement the function of each component.

As the storage medium, for example, a floppy (registered trademark) disk, a hard disk, an optical disk, a magneto-optical disk, a compact disk (CD)-ROM, a magnetic tape, a nonvolatile memory card, or a ROM can be used. Further, the scope of each of the example embodiments includes an example that operates on operating system (OS) to perform a process in cooperation with another software or a function of an add-in board without being limited to an example that performs a process by an individual program stored in the storage medium.

Further, a service implemented by the function of each of the example embodiments described above may be provided to a user in a form of Software as a Service (SaaS).

Note that all the example embodiments described above merely illustrate embodied examples in implementing the present invention, and the technical scope of the present invention should not be construed in a limiting sense by these example embodiments. That is, the present invention can be implemented in various forms without departing from the technical concept thereof or the primary feature thereof.

The whole or part of the example embodiments disclosed above can be described as, but not limited to, the following supplementary notes.

(Supplementary note 1)

An information processing system comprising:
  a voice information acquisition unit that acquires voice information including an utterance made by a person;
  a status acquisition unit that acquires status information related to status of the person; and
  a support information generation unit that generates support information used for supporting operation of the person based on the voice information and the status information.

(Supplementary note 2)

The information processing system according to supplementary note 1, wherein the status acquisition unit detects the status information based on an image including the person.

(Supplementary note 3)

The information processing system according to supplementary note 1 or 2, wherein the support information generation unit generates the support information by using a learning model generated by machine learning using training data including the voice information and the status information.

(Supplementary note 4)

The information processing system according to any one of supplementary notes 1 to 3, wherein the support information generation unit generates the support information by referencing a database in which the voice information, the status information, and the support information are associated with each other.

(Supplementary note 5)

The information processing system according to any one of supplementary notes 1 to 4, wherein the voice information acquisition unit acquires the voice information from an interaction between a salesclerk and a customer.

(Supplementary note 6)

The information processing system according to any one of supplementary notes 1 to 5, wherein the status information contains at least one of information related to a position of the person and information related to a work state of the person.

(Supplementary note 7)

The information processing system according to any one of supplementary notes 1 to 6 further comprising a notification unit that notifies the person of the support information by output of a voice or display on a display device.

(Supplementary note 8)

The information processing system according to any one of supplementary notes 1 to 7, wherein the support information contains an operation instruction to the person.

(Supplementary note 9)

The information processing system according to any one of supplementary notes 1 to 8, wherein the status acquisition unit acquires the status information based on information acquired by a device that is different from a device that acquires an utterance made by a salesclerk or a customer.

(Supplementary note 10)

The information processing system according to any one of supplementary notes 1 to 9 further comprising a conversion unit that converts the voice information into text information.

(Supplementary note 11)

The information processing system according to supplementary note 10 further comprising an extraction unit that extracts a keyword to be input to the support information generation unit from the text information.

(Supplementary note 12)

The information processing system according to any one of supplementary notes 1 to 11, wherein the status acquisition unit detects the status information based on an image including the person captured by a camera installed in a shop.

(Supplementary note 13)

The information processing system according to any one of supplementary notes 1 to 12, wherein the voice information is based on a voice acquired by a microphone worn by the person or a microphone installed in a shop.

(Supplementary note 14)

The information processing system according to any one of supplementary notes 1 to 13, wherein, based on at least one of the voice information and the status information, the support information generation unit further generates support information that is different from the support information.

(Supplementary note 15)

The information processing system according to any one of supplementary notes 1 to 14 further comprising a notification unit that notifies the person of the support information by output of a voice or display on a display device, wherein the notification unit provides a notification to the person based on at least one of the voice information and the status information via a device that is different from the display device.

(Supplementary note 16)

The information processing system according to any one of supplementary notes 1 to 15, wherein the support information generation unit controls a timing to provide the support information to the person based on at least one of the voice information and the status information.

(Supplementary note 17)

An information processing method comprising:
  acquiring voice information including an utterance made by a person;
  acquiring status information related to status of the person; and
  generating support information used for supporting operation of the person based on the voice information and the status information.

(Supplementary note 18)

A storage medium storing a program that causes a computer to perform an information processing method comprising:
  acquiring voice information including an utterance made by a person;
  acquiring status information related to status of the person; and
  generating support information used for supporting operation of the person based on the voice information and the status information.

This application is based upon and claims the benefit of priority from Japanese Patent Application No. 2018-134759, filed on Jul. 18, 2018, the disclosure of which is incorporated herein in its entirety by reference.

REFERENCE SIGNS LIST 100 shop
110 sales area
111 salesclerk
112 customer
113 camera
114 terminal apparatus
115 headset
116 headphone
117 microphone
200, 300 information processing system
201, 302 status acquisition unit
202, 301 voice information acquisition unit
203 conversion unit
204 extraction unit
205 notification unit
206, 303 support information generation unit
207 storage unit
251 CPU
252 RAM 253 ROM
254 HDD
255 communication I/F
256 display device
257 input device
258 bus
NW network

The invention claimed is:

1. An information processing method executed by a computer, the information processing method comprising:
correlating support information and a notified target for each of a keyword and status of a salesclerk;
extracting a keyword from an utterance of the salesclerk or a customer;
detecting, from an image capturing the salesclerk, a status of the salesclerk,
wherein the status includes position information representing whether the salesclerk is located in a sales area or in an area other than the sales area;
generating specific support information from a plurality of the support information using the extracted keyword and the detected status;
determining an output device of the notified target using the extracted keyword and the detected status; and
outputting the specific support information to the determined output device used by the salesclerk.

2. The information processing method according to claim 1, wherein the position information further includes information representing where the salesclerk is located in the sales area.

3. The information processing method according to claim 1, wherein the status further includes information as to whether the customer is present near the salesclerk.

4. The information processing method according to claim 1, wherein the status further includes information as to whether another salesclerk is present near the salesclerk.

5. The information processing method according to claim 1, wherein the status further includes information as to whether a predetermined article is present near the salesclerk.

6. The information processing method according to claim 5, wherein the predetermined article is at least one of a sales counter, a register, a terminal apparatus, a product shelf, and a store computer in the backyard.

7. The information processing method according to claim 1, wherein the output device is one of a terminal apparatus, a register, a headset, or a store computer.

8. An information processing apparatus comprising:
one or more memories storing instructions; and
one or more processors configured to execute the instructions to:
correlate support information and a notified target for each of a keyword and status of a salesclerk;
extract a keyword from an utterance of a salesclerk or a customer;
detect a status of the salesclerk, from an image capturing the salesclerk, wherein the status includes position information representing whether the salesclerk is located in a sales area or in an area other than the sales area;
generate specific support information using the extracted keyword and the detected status;
determine an output device of the notified target using the extracted keyword and the detected status; and
output the support information to the determined output device used by the salesclerk.

9. The information processing apparatus according to claim 8, wherein the output device is one of a terminal apparatus, a register, a headset, or a store computer.

* * * * *